(12) United States Patent
Abusleme et al.

(10) Patent No.: US 11,118,044 B2
(45) Date of Patent: Sep. 14, 2021

(54) DENSE FLUOROPOLYMER FILM

(71) Applicant: SOLVAY SPECIALTY POLYMERS ITALY S.P.A., Bollate (IT)

(72) Inventors: Julio A. Abusleme, Saronno (IT); Christine Hamon, Arese (IT); Giorgio Canil, Monza (IT); Marco Mirenda, Rho (IT)

(73) Assignee: SOLVAY SPECIALTY POLYMER ITALY S.P.A., Bollate (IT)

( * ) Notice: Subject to any disclaimer, the term of this patent is extended or adjusted under 35 U.S.C. 154(b) by 887 days.

(21) Appl. No.: 14/653,413

(22) PCT Filed: Dec. 17, 2013

(86) PCT No.: PCT/EP2013/076958
§ 371 (c)(1),
(2) Date: Jun. 18, 2015

(87) PCT Pub. No.: WO2014/095907
PCT Pub. Date: Jun. 26, 2014

(65) Prior Publication Data
US 2015/0349309 A1 Dec. 3, 2015

(30) Foreign Application Priority Data
Dec. 21, 2012 (EP) .................... 12199062

(51) Int. Cl.
| | |
|---|---|
| *H01M 2/16* | (2006.01) |
| *H01M 10/0525* | (2010.01) |
| *H01M 10/058* | (2010.01) |
| *C08J 5/22* | (2006.01) |
| *C08L 27/16* | (2006.01) |
| *C08F 214/22* | (2006.01) |
| *C08L 71/02* | (2006.01) |
| *H01M 50/411* | (2021.01) |
| *H01M 50/446* | (2021.01) |

(52) U.S. Cl.
CPC ............ *C08L 27/16* (2013.01); *C08F 214/22* (2013.01); *C08F 214/225* (2013.01); *C08J 5/2268* (2013.01); *C08L 71/02* (2013.01); *H01M 10/058* (2013.01); *H01M 10/0525* (2013.01); *H01M 50/411* (2021.01); *H01M 50/446* (2021.01); *C08J 2387/00* (2013.01); *C08L 2666/24* (2013.01); *H01M 2220/30* (2013.01); *Y10T 29/4911* (2015.01)

(58) Field of Classification Search
CPC ............ H01M 10/058; H01M 2220/30; C08L 71/02; C08F 214/22; Y10T 29/4911; C08J 2371/02
USPC ...................................................... 429/251
See application file for complete search history.

(56) References Cited

U.S. PATENT DOCUMENTS

| | | | |
|---|---|---|---|
| 6,203,944 B1 | 3/2001 | Turner et al. | |
| 6,986,967 B2* | 1/2006 | Barton | B29C 48/307 |
| | | | 429/217 |
| 2002/0061448 A1* | 5/2002 | Morigaki | H01M 4/622 |
| | | | 429/253 |
| 2002/0197536 A1 | 12/2002 | Mori et al. | |
| 2003/0039886 A1 | 2/2003 | Zhang et al. | |
| 2012/0125835 A1 | 5/2012 | Abusleme et al. | |

FOREIGN PATENT DOCUMENTS

| | | |
|---|---|---|
| EP | 2397519 A1 | 12/2011 |
| WO | 0003444 A1 | 1/2000 |
| WO | 0222712 A2 | 3/2002 |
| WO | 2008129041 A1 | 10/2008 |
| WO | 2009086347 A1 | 7/2009 |
| WO | 2011015517 A1 | 2/2011 |
| WO | 2012175416 A1 | 12/2012 |

OTHER PUBLICATIONS

Smolders K. et al., "Terminology for membrane distillation", Desalination, 1989, 72, p. 249-262—Elsevier Science Publishers B.V., Amsterdam.

Wang P. et al., "Plasma-induced immobilization of poly(ethylene glycol) onto poly(vinylidene fluoride) microporous membrane", Journal of Membrane Science, Jan. 1, 2002 (Jan. 1, 2002), vol. 195, No. 1, pp. 103-114, XP004308439, ISSN: 0376-7388, DOI: 10.1016/S0376-7388(01)00548-8, Elsevier Scientific Publ.Company. Amsterdam, NL.

* cited by examiner

Primary Examiner — Miriam Stagg
Assistant Examiner — Rachel L Zhang
(74) *Attorney, Agent, or Firm* — Osha Bergman Watanabe & Burton LLP

(57) ABSTRACT

The present invention pertains to a process for the manufacture of a dense film. The process includes processing, in a molten phase, a solid composition [composition (C)] comprising;
at least one vinylidene fluoride (VDF) fluoropolymer comprising one or more carboxylic acid functional end groups [polymer (F)],
at least one poly(alkylene oxide) (PAO) of formula (I):

$$HO-(CH_2CHR_AO)_n-R_B \quad (I)$$

wherein $R_A$ is a hydrogen atom or a $C_1$-$C_5$ alkyl group, $R_B$ is a hydrogen atom or a $-CH_3$ alkyl group and n is an integer comprised between 2000 and 40000, preferably between 4000 and 35000, more preferably between 11500 and 30000, and -optionally, at least one inorganic filler [filler (I)]; thereby providing a dense film having a thickness of from 5 μm to 30 μm.

The present invention also pertains to the dense film provided by this process and to the use of the dense film as dense separator in electrochemical devices.

12 Claims, No Drawings

DENSE FLUOROPOLYMER FILM

This application is a U.S. national stage entry under 35 U.S.C. § 371 of International Application No. PCT/EP2013/076958 filed Dec. 17, 2013, which claims priority to European application No. 12199062.6 filed on Dec. 21, 2012. The entire contents of these applications are explicitly incorporated herein by this reference.

TECHNICAL FIELD

The present invention pertains to a dense film, to a process for the manufacture of said film and to use of said film as dense separator in electrochemical devices.

BACKGROUND ART

The battery industry has seen an enormous growth in the past years in rechargeable secondary batteries due to the widespread use of portable electronic devices and telecommunications equipments such as cell phones, personal digital assistants (PDA's), laptop computers and other wireless electronics.

The continued growth in Lithium-ion battery market in particular has led to a strong demand for battery separators. A variety of separators have been used in batteries over the years. Their main function is to prevent electronic contact, while enabling ionic transport between the positive and negative electrodes of electrochemical cells.

Although the material of a battery separator is inert and does not influence electrical energy storage or output, its physical properties greatly influence the performance and safety of the battery.

The most commonly used separators for secondary batteries are either porous separators made of microporous polymeric films or of non-woven fabrics or dense separators made of polymeric electrolytes.

Among polymeric electrolytes particularly suitable for use in secondary batteries, electrolytes have been proposed wherein a polymer matrix is swollen with a liquid electrolyte.

For instance, US 2002/0197536 (SAMSUNG SDI CO. LTD.) 26.12.2002 discloses a polymeric electrolyte for use in Lithium batteries comprising a vinylidene fluoride-hexafluoropropylene copolymer or a copolymer further comprising recurring units of at least one compound selected from the group consisting of acrylic acid and maleic acid monoalkylester.

Nevertheless, as there is an increasing demand for secondary batteries complying with huge performance and safety requirements, secondary batteries need to be designed and constructed which are resistant to typical abuse conditions such as internal shorting, overcharge, overdischarge, vibration, shock and temperature variations.

An abnormal increase in the temperature of the battery can occur from internal heating caused by either electrical abuse (e.g. overcharge or short circuit) or mechanical abuse (e.g. nail penetration or crush) or could also be a result of external heating.

The greater the mechanical integrity of the separator at low and at high temperatures, the greater the margin of safety the separator can provide. If the separator loses its mechanical integrity, then the electrodes can come into direct contact, react chemically and result in thermal runaway. The high-temperature melt integrity of the separator is indeed a very important property to keep the battery safe during extended overcharge or during extended exposure to higher temperatures.

There is thus still a need in the art for separators endowed with outstanding ionic conductivity values and thermal stability properties while keeping their mechanical integrity over a wide range of temperatures to be suitable for the manufacture of electrochemical devices.

SUMMARY OF INVENTION

It is thus an object of the present invention a process for the manufacture of a dense film, said process comprising, preferably consisting of the following steps:
(a) providing a solid composition [composition (C)] comprising, preferably consisting of:
at least one vinylidene fluoride (VDF) fluoropolymer comprising one or more carboxylic acid functional end groups [polymer (F)],
at least one poly(alkylene oxide) (PAO) of formula (I):

HO—(CH$_2$CHR$_A$O)$_n$—R$_B$                     (I)

wherein R$_A$ is a hydrogen atom or a C$_1$-C$_5$ alkyl group, R$_B$ is a hydrogen atom or a —CH$_3$ alkyl group and n is an integer comprised between 2000 and 40000, preferably between 4000 and 35000, more preferably between 11500 and 30000, and
optionally, at least one inorganic filler [filler (I)]; and
(b) processing said composition (C) in molten phase thereby providing a dense film having a thickness of from 5 μm to 30 μm.

It is also an object of the present invention the dense film manufactured according to the process of the invention, said film being made of a fluoropolymer composition [composition (F)] comprising, preferably consisting of:
(A) at least one grafted fluoropolymer [polymer (Fg)] comprising:
at least one fluorinated backbone comprising recurring units derived from vinylidene fluoride (VDF) and from one or more hydrogenated monomers, and
at least one pendant side chain linked to one or more fluorinated backbones of the polymer (Fg) through one or more ester functional groups, said pendant side chain comprising alkylene oxide recurring units of formula:

—(CH$_2$CHR$_A$O)$_n$— wherein R$_A$ is a hydrogen atom or a C$_1$-C$_5$ alkyl group and n is an integer comprised between 1 and 35000,
(B) optionally, up to 70% by weight, preferably up to 30% by weight, relative to the total weight of said composition (F), of at least one poly(alkylene oxide) (PAO) of formula (I):

HO—(CH$_2$CHR$_A$O)$_n$—R$_B$                     (I)

wherein R$_A$ is a hydrogen atom or a C$_1$-C$_5$ alkyl group, R$_B$ is a hydrogen atom or a —CH$_3$ alkyl group and n is an integer comprised between 2000 and 40000, preferably between 4000 and 35000, more preferably between 11500 and 30000, and
(C) optionally, at least one inorganic filler [filler (I)],
said film having a thickness of from 5 μm to 30 μm.

The dense film of the invention is advantageously obtainable by the process of the invention.

The Applicant thinks, without this limiting the scope of the invention, that the poly(alkylene oxide) (PAO) is degraded under the process of the invention so that the polymer (Fg) constituting the dense film thereby provided advantageously comprises pendant side chains comprising alkylene oxide recurring units of formula —$CH_2CHR_AO$— deriving therefrom.

The dense film of the invention is particularly suitable for use as dense separator in electrochemical devices.

The dense separator is advantageously obtainable by the process of the invention.

It is thus also an object of the present invention a process for the manufacture of an electrochemical device, said process comprising, preferably consisting of the following steps:
(i) providing a dense separator,
(ii) interposing the dense separator provided in step (i) between a negative electrode and a positive electrode thereby assembling an electrochemical device, and
(iii) injecting an electrolyte into the electrochemical device provided in step (ii), wherein the dense separator is manufactured by:
(a) providing a solid composition [composition (C)] comprising, preferably consisting of:
at least one vinylidene fluoride (VDF) fluoropolymer comprising one or more carboxylic acid functional end groups [polymer (F)],
at least one poly(alkylene oxide) (PAO) of formula (I):

$$HO—(CH_2CHR_AO)_n—R_B \qquad (I)$$

wherein $R_A$ is a hydrogen atom or a $C_1$-$C_5$ alkyl group, $R_B$ is a hydrogen atom or a —$CH_3$ alkyl group and n is an integer comprised between 2000 and 40000, preferably between 4000 and 35000, more preferably between 11500 and 30000, and optionally, at least one inorganic filler [filler (I)]; and
(b) processing said composition (C) in molten phase thereby providing a dense separator having a thickness of from 5 μm to 30 μm.

By the term "dense", it is hereby intended to denote either a film or a separator having a porosity of less than 5% by volume, relative to the total volume of said film or separator.

Determination of the porosity of the film can be performed by any suitable method. Mention can be notably made of the procedure described in SMOLDERS, K., et al. Terminology for Membrane Distillation. *Desalination*. 1989, vol. 72, p. 249-262.

The Applicant has surprisingly found that the dense film provided by the process of the invention is successfully endowed with both outstanding ionic conductivity values and outstanding mechanical properties over a range of temperatures of from −30° C. to 100° C. to be suitably used as dense separator in electrochemical devices.

The Applicant has also surprisingly found that the dense separator hereby provided, due to its relatively small thickness of from 5 μm to 30 μm, ensures a satisfactory swellability by electrolytes injected therein in the process for the manufacture of an electrochemical device.

Determination of the thickness of the film can be performed by any suitable method. Mention can be notably made of measurements according to DIN 53370 standard procedure.

By the term "vinylidene fluoride (VDF) fluoropolymer", it is hereby intended to denote a polymer comprising recurring units derived from vinylidene fluoride (VDF).

The VDF polymer may further comprise recurring units derived from one or more fluorinated monomers different from VDF.

By the term "fluorinated monomer", it is hereby intended to denote an ethylenically unsaturated monomer comprising at least one fluorine atom.

The polymer (F) typically comprises recurring units derived from vinylidene fluoride (VDF), from at least one hydrogenated monomer comprising one or more carboxylic acid functional end groups [monomer (H)] and, optionally, from one or more fluorinated monomers different from VDF.

By the term "hydrogenated monomer", it is hereby intended to denote an ethylenically unsaturated monomer comprising at least one hydrogen atom and free from fluorine atoms.

The term "at least one monomer (H)" is understood to mean that the polymer (F) may comprise recurring units derived from one or more than one monomers (H) as defined above. In the rest of the text, the expression "monomer (H)" is understood, for the purposes of the present invention, both in the plural and the singular, that is to say that they denote both one or more than one monomers (H) as defined above.

The polymer (F) preferably comprises at least 0.01% by moles, more preferably at least 0.05% by moles, even more preferably at least 0.1% by moles of recurring units derived from at least one monomer (H) as defined above.

The polymer (F) preferably comprises at most 20% by moles, more preferably at most 15% by moles, even more preferably at most 10% by moles, most preferably at most 3% by moles of recurring units derived from at least one monomer (H) as defined above.

Determination of the average mole percentage of monomer (H) recurring units in polymer (F) can be performed by any suitable method. Mention can be notably made of acid-base titration methods, well suited e.g. for the determination of the acrylic acid content, of NMR methods, adequate for the quantification of monomers (H) comprising aliphatic hydrogens in side chains, of weight balance based on total fed monomer (H) and unreacted residual monomer (H) during polymer (F) manufacture.

The monomer (H) is preferably a (meth)acrylic monomer [monomer (MA)] of formula (II):

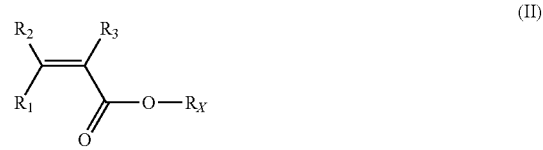

(II)

wherein:
$R_1$, $R_2$ and $R_3$, equal to or different from each other, are independently selected from a hydrogen atom and a $C_1$-$C_3$ hydrocarbon group, and
$R_X$ is a hydrogen atom or a $C_1$-$C_5$ hydrocarbon group comprising at least one carboxylic acid functional end group.

The monomer (H) is more preferably a (meth)acrylic monomer [monomer (MA)] of formula (II-A):

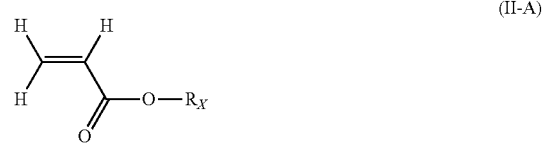

(II-A)

wherein $R_X$ is a hydrogen atom or a $C_1$-$C_5$ hydrocarbon group comprising at least one carboxylic acid functional end group.

Non-limitative examples of suitable monomers (MA) include, notably, acrylic acid (AA) and methacrylic acid.

The monomer (MA) is even more preferably acrylic acid (AA) of formula:

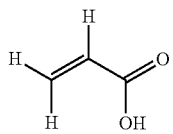

Non limitative examples of suitable fluorinated monomers include, notably, the followings:

$C_3$-$C_8$ perfluoroolefins, such as tetrafluoroethylene, and hexafluoropropene;

$C_2$-$C_8$ hydrogenated fluoroolefins, such as vinyl fluoride, 1,2-difluoroethylene and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$ functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

The polymer (F) more preferably comprises:
(a') at least 60% by moles, preferably at least 75% by moles, more preferably at least 85% by moles of vinylidene fluoride (VDF);
(b') optionally, from 0.1% to 15% by moles, preferably from 0.1% to 12% by moles, more preferably from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.01% to 20% by moles, preferably from 0.05% to 18% by moles, more preferably from 0.1% to 10% by moles of at least one monomer (MA) of formula (II) as defined above.

The polymer (F) can be manufactured by aqueous suspension polymerization or by aqueous emulsion polymerization processes. The polymer (F) is preferably manufactured by an aqueous suspension polymerization process as described in WO 2008/129041 (SOLVAY SOLEXIS S.P.A.) 30.10.2008.

The poly(alkylene oxide) (PAO) of formula (I) as defined above typically has an average molecular weight comprised between 100000 and 1800000, preferably between 500000 and 1500000.

The PAO of formula (I) as defined above is usually provided as a solid under the form of powder.

For the purpose of the present invention, by the term "solid" it is hereby intended to denote a material in the solid state at 20° C. under atmospheric pressure.

The PAO of formula (I) as defined above is preferably a poly(ethylene oxide) (PEO) complying with formula (I-A):

wherein n is an integer comprised between 2000 and 40000, preferably between 4000 and 35000, more preferably between 11500 and 30000.

Very good results have been obtained with PEOs complying with formula (I-A) as defined above, wherein n is an integer comprised between 4000 and 30000.

The filler (I) is generally provided under the form of particles.

The filler (I) particles generally have an average particle size comprised between 0.001 μm and 1000 μm, preferably between 0.01 μm and 800 μm, more preferably between 0.03 μm and 500 μm.

Among fillers (I) suitable for being used in the process of the invention, mention can be made of inorganic oxides, including mixed oxides, metal sulphates, metal carbonates, metal sulfides and the like.

Among metal oxides, mention can be made of $SiO_2$, $TiO_2$, ZnO, $Al_2O_3$.

The solid composition [composition (C)] of the process of the invention is present in its solid state at 20° C. under atmospheric pressure.

The composition (C) typically comprises, preferably consists of:
from 20% to 95% by volume, preferably from to 45% to 90% by volume, relative to the total volume of the composition (C), of at least one polymer (F) as defined above, and
from 5% to 80% by volume, preferably from 10% to 55% by volume, relative to the total volume of the composition (C), of at least one PAO of formula (I) as defined above, preferably at least one PEO of formula (I-A) as defined above.

The composition (C) is typically prepared using standard methods.

Usual mixing devices such as static mixers and high intensity mixers can be used. High intensity mixers are preferred for obtaining better mixing efficiency.

In step (b) of the process of the invention, the composition (C) is typically processed in molten phase using melt-processing techniques.

The composition (C) is usually processed by extrusion through a die at temperatures generally comprised between 100° C. and 300° C., preferably between 100° C. and 250° C., to yield strands which are usually cut for providing pellets.

Twin screw extruders are preferred devices for accomplishing melt compounding of the composition (C).

The dense film of the invention, having a thickness of from 5 μm to 30 μm, can then be manufactured by processing the pellets so obtained through traditional film extrusion techniques. Film extrusion is preferably accomplished using a flat cast film extrusion process or a hot blown film extrusion process.

Particularly preferred dense films of the invention are those having a thickness of from 5 μm to 25 μm.

The dense film provided by the process of the invention is advantageously made of a composition (F) comprising, preferably consisting of:
- from 55% to 95% by weight, relative to the total weight of said composition (F), of at least one polymer (Fg) as defined above, and
- from 5% to 45% by weight, relative to the total weight of said composition (F), of at least one PEO of formula (I-A) as defined above, said film having a thickness of from 5 μm to 30 μm.

By the term "fluorinated backbone", it is hereby intended to denote a fluoropolymer chain comprising recurring units derived from one or more fluorinated monomers and from one or more hydrogenated monomers, said recurring units being randomly distributed along the backbone chain.

The pendant side chain of the polymer (Fg) preferably comprises ethylene oxide recurring units of formula:

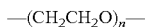

—(CH$_2$CH$_2$O)$_n$— wherein n is an integer comprised between 1 and 35000.

The fluorinated backbone of the polymer (Fg) preferably comprises recurring units derived from polymer (F), said fluorinated backbone comprising recurring units derived from vinylidene fluoride (VDF), from at least one hydrogenated monomer and, optionally, from one or more fluorinated monomers different from VDF, said recurring units being randomly distributed along the fluorinated backbone.

The grafted fluoropolymer [polymer (Fg)] of the invention advantageously comprises at least 5% by moles, preferably at least 10% by moles, more preferably at least 25% by moles of alkylene oxide recurring units of formula —CH$_2$CHR$_A$O—, wherein R$_A$ is defined as above, relative to the total volume of poly(alkylene oxide) (PAO) in the composition (C).

The grafted fluoropolymer [polymer (Fg)] of the invention advantageously comprises at least 5% by weight, preferably at least 20% by weight, more preferably at least 50% by weight of alkylene oxide recurring units of formula —CH$_2$CHR$_A$O—, wherein R$_A$ is defined as above, relative to the total weight of poly(alkylene oxide) (PAO) in the composition (C).

Determination of the average percentage of alkylene oxide recurring units in the polymer (Fg) can be performed by any suitable method.

Non-limitative examples of suitable electrochemical devices include, notably, secondary batteries such as alkaline or alkaline-earth secondary batteries.

Representative negative electrodes of alkaline or alkaline-earth secondary batteries notably include the followings:
- alkaline or alkaline-earth metal, including lithium, sodium, magnesium or calcium;
- graphitic carbons able to intercalate alkaline or alkaline-earth metal, typically existing in forms such as powders, flakes, fibers or spheres (for example, mesocarbon microbeads) hosting at least one alkaline or alkaline-earth metal;
- alkaline or alkaline-earth metal alloy compositions, including silicon-based alloys, germanium-based alloys;
- alkaline or alkaline-earth metal titanates, advantageously suitable for intercalating alkaline or alkaline-earth metal with no induced strain.

The secondary battery of the invention is more preferably a Lithium-ion battery.

Representative negative electrodes of Lithium-ion batteries include, notably, the followings:
- graphitic carbons able to intercalate lithium, typically existing in forms such as powders, flakes, fibers or spheres (for example, mesocarbon microbeads) hosting lithium;
- lithium metal;
- lithium alloy compositions, including notably those described in U.S. Pat. No. 6,203,944 (3M INNOVATIVE PROPERTIES CO.) 20.03.2001 and/or in WO 00/03444 (MINNESOTA MINING AND MANUFACTURING CO.) 20.01.2000;
- lithium titanates, generally represented by formula Li$_4$Ti$_5$O$_{12}$; these compounds are generally considered as "zero-strain" insertion materials, having low level of physical expansion upon taking up the mobile ions, i.e. Li$^+$;
- lithium-silicon alloys, generally known as lithium silicides with high Li/Si ratios, in particular lithium silicides of formula Li$_{4.4}$Si;
- lithium-germanium alloys, including crystalline phases of formula Li$_{4.4}$Ge.

The negative electrode may contain additives as will be familiar to those skilled in the art. Among them, mention can be made notably of carbon black, graphene or carbon nanotubes.

As will be appreciated by those skilled in the art, the negative electrode or anode may be in any convenient form including foils, plates, rods, pastes or as a composite made by forming a coating of the negative electrode material on a conductive current collector or other suitable support.

As will be appreciated by those skilled in the art, the electrolyte may be in any convenient form including liquids and gels.

Non-limitative examples of suitable electrolytes include, notably, liquids or gels (e.g. solvating polymers such as poly(oxyethylene)) capable of solubilising sufficient quantities of metal salt and, optionally, other ingredients or additives, so that a suitable quantity of charge can be transported between the positive electrode and the negative electrode.

Representative electrolytes include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, gamma-butyrolactone, methyl difluoroacetate, ethyl difluoroacetate, dimethoxyethane, diglyme (bis(2-methoxyethyl) ether), non-protonic ionic liquids, poly(oxyethylene)s and combinations thereof.

A variety of metal salts may be employed in the electrolyte. Metal salts which are stable and soluble in the chosen electrolyte will be generally selected for the metal-ion cell of the invention.

Metal salts suitable for the metal-ion cell of the invention are notably M(PF$_6$)$_n$, M(BF$_4$)$_n$, M(ClO$_4$)$_n$, M(bis(oxalato)borate)$_n$ ("M(BOB)$_n$"), M[N(CF$_3$SO$_2$)$_2$]$_n$, M[N(C$_2$F$_5$SO$_2$)$_2$]$_n$, M[N(CF$_3$SO$_2$)(R$_F$SO$_2$)]$_n$ with R$_F$ being C$_2$F$_5$, C$_4$F$_9$, CF$_3$OCF$_2$CF$_2$, M(AsF$_6$)$_n$, M[C(CF$_3$SO$_2$)$_3$]$_n$, with M being a metal, preferably a transition metal, an alkaline metal or an alkaline-earth metal, more preferably M is Li, Na, K or Cs, and n is the valence of said metal, typically n is 1 or 2.

Among preferred lithium salts for Lithium-ion cells, mention can be made of LiPF$_6$, LiBF$_4$, LiClO$_4$, lithium bis(oxalato)borate ("LiBOB"), LiN(CF$_3$SO$_2$) 2, LiN(C$_2$F$_5$SO$_2$)$_2$, M[N(CF$_3$SO$_2$)(R$_F$SO$_2$)]n with R$_F$ being C$_2$F$_5$, C$_4$F$_9$, CF$_3$ OCF$_2$CF$_2$, LiAsF$_6$, LiC(CF$_3$SO$_2$)$_3$ and combinations thereof.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not (imitative of the scope of the invention.

Raw Materials

Polymer (F-1): VDF/AA copolymer containing 1% by moles of acrylic acid (AA), having a melt flow index of 5.2 g/10 min as measured according to ASTM D1238 (230° C., 2.16 Kg) and a melting point of 169° C.

Polymer (F-2): VDF/HFP/AA copolymer prepared as described below having a melting point of 162° C.

SOLEF® 21508 VDF/HFP copolymer having a melt flow index of 6.4 g/10 min as measured according to ASTM D1238 (230° C., 2.16 Kg) and a melting point of 134° C.

SOLEF® 6008 PVDF homopolymer having a melt flow index of 6.0 g/10 min as measured according to ASTM D1238 (230° C., 2.16 Kg) and a melting point of 172° C.

PEO-1: poly(ethylene oxide) having an average molecular weight comprised between 1000000 and 1200000.

Manufacture of Polymer (F-2)

In a 4 lt. reactor equipped with an impeller running at a speed of 880 rpm were introduced in sequence 2460 g of demineralized water and 0.63 g of METHOCEL® K100 GR suspending agent.

The reactor was vented and pressurized with nitrogen to 1 bar, then 9.98 g of a 75% by volume solution of t-amyl perpivalate initiator in isododecane and 5.35 g of diethyl carbonate were introduced into the reactor, followed by 0.5 g of acrylic acid (AA), 107 g of HFP monomer and 949 g of VDF monomer. The reactor was then gradually heated to 55° C. to a final pressure of 110 bar. Temperature was maintained constant at 55° C. throughout the whole trial. Pressure was maintained constant at 110 bar throughout the whole trial by feeding a 17.44 g/l aqueous solution of AA monomer to a total of 750 ml. After 516 minutes the polymerization run was stopped by degassing the suspension until reaching atmospheric pressure. The polymer so obtained was then recovered, washed with demineralised water and oven-dried at 50° C. (852 g).

The polymer so obtained contained 2.5% by moles of HFP and 1.0% by moles of AA, as determined by NMR.

General Procedure for the Manufacture of Films

A polymer and a poly(alkylene oxide) (PAO) were blended under the form of powders and mixed in a rapid mixer equipped with a three stages paddles mixer so as to obtain a homogeneous powder mixture having the required volume ratio.

The mixture was stirred at 300 rpm for 3 minutes and then processed by extrusion in a LEISTRITZ LSM 30/34 twin-screw extruder, equipped with 6 temperature zones and a 4 mm-2 holes die. The set of temperatures in the extruder run from 140° C. to 180° C. The extruded strands were cooled in air, dried and cut in a pelletizer.

Films were manufactured from the pellets so obtained either by flat cast film extrusion or by hot blown film extrusion.

Flat Cast Film Extrusion

Pellets were processed in a single screw Braebender extruder (screw speed=25 rpm) equipped with 5 temperature zones maintained at 210° C. and a 0.5 mm×100 mm tape die. Upon exit from the die, the molten tape was rolled onto two subsequent chill rolls kept at a temperature of 115° C., whose speed was adapted so as to obtain a film thickness of about 10-30 μm.

Hot Blown Film Extrusion

Pellets were processed in a single screw Dr. Collin GmbH extruder having a diameter of 30 mm and a L/D of 28. The extruder was equipped with 5 heating zones, set as detailed in Table 1 here below, and an annular die having an external diameter of 51.5 mm and a gap of 0.25 mm, the die having 4 heating zones maintained at 225° C.

TABLE 1

| Feed zone | T1 | T2 | T3 | T4 | Pipe |
|---|---|---|---|---|---|
| 35° C. | 180° C. | 190° C. | 200° C. | 210° C. | 210° C. |

The extruder speed was set at 20 rpm and the line speed was adjusted to obtain the desired thickness of the film. The melt temperature was 214° C. The blown-up ratio was controlled by bubble internal air pressure. Upon extrusion, the bubble was collapsed in a converging frame, cooled by means of cold rollers and wound.

Measurement of the Amount of PAO Grafted to Polymer (F) Relative to the Total Amount of PAO in the Composition (C)

A film sample of about 6×6 cm was dipped in a 1 liter water bath at 25° C., under stirring, for 2 minutes. This washing step was repeated three times. The film was then left in the water bath overnight and was afterwards dipped again in a water bath according to the procedure as detailed hereinabove. The film was subsequently dried in oven at 60° C. for 4 hours and weighed [$M_{polymer(Fg)}$].

The amount of PAO grafted to polymer (F) was measured according to the following formula:

$$\text{PAO grafted to polymer } (F)[\% \ wt.] = [(M_{polymer(Fg)} - M_{polymer(F)})/(M_{PAO})] \times 100$$

wherein:

$M_{polymer(Fg)}$ represents the total weight [grams] of the polymer (Fg) after washing procedure, $M_{polymer(F)}$ represents the total weight [grams] of the polymer (F) in the composition (C), and $M_{PAO}$ represents the total weight [grams] of PAO in the composition (C).

Measurement of the Thickness of Films

The thickness of the films was measured using a micrometer screw according to DIN 53370 standard procedure.

EXAMPLE 1

Blend of Polymer (F-1) and PEO-1 (50:50 Volume Ratio)

A film having a thickness of 24 μm was prepared by hot blown film extrusion from a 50:50 by volume blend of polymer (F-1) and PEO-1. FT-IR spectroscopic analyses on the dense film so obtained have shown the appearance of an ester band at about 1730-1740 cm$^{-1}$.

The amount of recurring units of formula —CH$_2$CH$_2$O— of PEO-1 grafted to the polymer (F-1) was 34% by weight, relative to the total weight of PEO-1 in the blend.

The dense film so obtained had an ionic conductivity of 4.58×10$^{-4}$ S/cm. The mechanical properties of the dense film so obtained in machine direction (MD) and transversal direction (TD) at 23° C., according to ASTM D638 standard procedure (Type V) (grip distance: 25.4 mm, Lo: 21.5 mm, speed rate: 1-50 mm/min) are set forth in Table 2 here below.

TABLE 2

|    | Modulus [MPa] | Yield Stress [MPa] | Yield Strain [%] | Stress at break [MPa] | Strain at break [%] |
|----|---------------|--------------------|--------------------|-----------------------|---------------------|
| MD | 449 | 15.2 | 7.6 | 18.1 | 194.6 |
| TD | 725 | 13.0 | 3.6 | 12.0 | 141.1 |

It has been thus found that the dense films provided by the process according to the invention are advantageously endowed with superior ionic conductivity values as compared with those of commercially available dense films made of the following fluoropolymers:

polymer (F-1): $2.13 \times 10^{-5}$ S/cm
polymer (F-2): $4.47 \times 10^{-5}$ S/cm
SOLEF® 21508 VDF/HFP: $5.1 \times 10^{-5}$ S/cm

EXAMPLE 2

Blend of Polymer (F-1) and PEO-1 (90:10 Volume Ratio)

A film having a thickness of 13 μm was prepared by flat cast film extrusion from a 90:10 by volume blend of polymer (F-1) and PEO-1.

FT-IR spectroscopic analyses on the dense film so obtained have shown the appearance of an ester band at about 1730-1740 cm$^{-1}$.

The amount of recurring units of formula —$CH_2CH_2O$— of PEO-1 grafted to the polymer (F-1) was 88% by weight, relative to the total weight of PEO-1 in the blend.

The mechanical properties of the dense film so obtained in transversal direction (TD) at 23° C. and −30° C., according to ASTM D638 standard procedure (Type V) (grip distance: 25.4 mm, Lo: 21.5 mm, speed rate: 1-50 mm/min) are set forth in Table 3 here below.

TABLE 3

|  | Ex. 2 | Ex. 2 | SOLEF ® 6008 PVDF | SOLEF ® 6008 PVDF |
|---|---|---|---|---|
| Modulus [MPa] | 699 (23° C.) | 2248 (−30° C.) | 1842 (23° C.) | 3224 (−30° C.) |
| Yield Stress [MPa] | 34.3 (23° C.) | 76.7 (−30° C.) | 60.0 (23° C.) | 104.3 (−30° C.) |
| Yield Strain [MPa] | 11.3 (23° C.) | 11.5 (−30° C.) | 6.3 (23° C.) | 6.6 (−30° C.) |
| Stress at break [MPa] | 82.1 (23° C.) | 75.3 (−30° C.) | 91.4 (23° C.) | 88.3 (−30° C.) |
| Strain at break [%] | 452 (23° C.) | 157 (−30° C.) | 460 (23° C.) | 14 (−30° C.) |
| Energy [mJ/mm3] | — | 102 (−30° C.) | — | 11.5 (−30° C.) |

The results set forth in Tables 2 and 3 here above have shown that the dense films provided by the process according to the invention are advantageously endowed with superior mechanical properties in a wide range of temperatures of from −30° C. to 100° C. as compared with those of commercially available dense films.

In view of the above, it has been found that the dense films provided by the process according to the invention, advantageously combining both outstanding ionic conductivity and outstanding mechanical properties, are particularly suitable for use as dense separators in electrochemical devices.

Manufacture of a Lithium-Ion Battery

A coin cell was prepared by placing the dense film as prepared according to Example 1 between Lithium metal negative electrode and a positive electrode containing LiFePO$_4$ as active material, SOLEF® 5130 PVDF as binder and Super P® Li conductive carbon black.

The coin cell was filled with 200 μl of Selectilyte® LP30 electrolyte consisting of a 1 M solution of LiPF$_6$ in ethylene carbonate/dimethyl carbonate (1:1 weight ratio).

The discharge capacity values of the coin cell so obtained at different discharge rates are set forth in Table 4 here below.

TABLE 4

| Rate | | Average Discharge [mAh/g] | [%] |
|---|---|---|---|
| 5 | Discharge 5D | 58.2 | 37.1 |
| 2 | Discharge 2D | 116.5 | 74.2 |
| 1 | Discharge D | 133.6 | 85.0 |
| 0.33 | Discharge D/3 | 149.0 | 94.9 |
| 0.2 | Discharge D/5 | 151.3 | 96.4 |
| 0.1 | Discharge D/10 | 155.0 | 98.7 |
| 0.05 | Discharge D/20 | 154.8 | 98.6 |

The invention claimed is:
1. A process for the manufacture of a dense film, said process comprising:
processing, in a molten phase, a solid composition (C), said composition (C) comprising:
at least one polymer (F), wherein polymer (F) is a fluoropolymer comprising recurring units derived from vinylidene fluoride (VDF), recurring units derived from at least one (meth)acrylic monomer (MA) of formula (II):

wherein:
R$_1$, R$_2$ and R$_3$, equal to or different from each other, are independently selected from a hydrogen atom and a C$_1$-C$_3$ hydrocarbon group, and
R$_x$ is a hydrogen atom or a C$_1$-C$_5$ hydrocarbon group and, optionally, from one or more fluorinated monomers different from VDF;
and one or more carboxylic acid functional end groups, at least one poly(alkylene oxide) (PAO) of formula (I):

HO—(CH$_2$CHR$_A$O)$_n$—R$_B$     (I)

wherein R$_A$ is a hydrogen atom or a C$_1$-C$_5$ alkyl group, R$_B$ is a hydrogen atom or a —CH$_3$ alkyl group and n is an integer comprised between 2000 and 40000, and
optionally, at least one inorganic filler [filler (I)];
thereby providing a dense film having a thickness of from 5 μm to 30 μm formed of at least one grafted fluoropolymer [polymer (Fg)] comprising:

at least one fluorinated backbone comprising recurring units derived from vinylidene fluoride (VDF) and from one or more hydrogenated monomers, and at least one pendant side chain linked to one or more fluorinated backbones of the polymer (Fg) through one or more ester functional groups, said pendant side chain comprising alkylene oxide recurring units of formula:

$$—(CH_2CHR_4O)_n—.$$

2. The process according to claim 1, wherein monomer (MA) is acrylic acid (AA).

3. The process according to claim 1, wherein the PAO of formula (I) has an average molecular weight comprised between 100000 and 1800000.

4. The process according to claim 1, wherein the PAO of formula (I) is a poly(ethylene oxide) (PEO) complying with formula (I-A):

$$HO—(CH_2CH_2O)_n—CH_3 \qquad (I-A)$$

wherein n is an integer comprised between 2000 and 40000.

5. The process according to claim 4, wherein n is an integer comprised between 11500 and 30000.

6. The process according to claim 1, wherein the composition (C) comprises:

from 20% to 95% by volume, relative to the total volume of composition (C), of at least one polymer (F), and from 5% to 80% by volume, relative to the total volume of composition (C), of at least one PAO of formula (I).

7. The process according to claim 6, wherein the composition (C) comprises:

from 45% to 90% by volume, relative to the total volume of composition (C), of at least one polymer (F), and from 10% to 55% by volume, relative to the total volume of composition (C), of at least one PAO of formula (I-A).

8. The process according to claim 1, wherein composition (C) is processed in molten phase using melt-processing techniques.

9. A dense film obtained by the process according to claim 1.

10. A process for the manufacture of an electrochemical device, said process comprising:

interposing a dense separator between a negative electrode and a positive electrode thereby assembling an electrochemical device, and injecting an electrolyte into the electrochemical device, wherein the dense separator is obtained by the process according to claim 1.

11. The process according to claim 10, wherein the electrochemical device is a secondary battery such as an alkaline or alkaline-earth secondary battery.

12. The process according to claim 10, wherein the electrochemical device is a Lithium-ion battery.

* * * * *